United States Patent [19]

Yasukawa et al.

[11] Patent Number: 4,941,098

[45] Date of Patent: Jul. 10, 1990

[54] SPEED CONTROL UNIT FOR AN AUTOMOBILE

[75] Inventors: Takeshi Yasukawa; Masayoshi Onishi, both of Himeji, Japan

[73] Assignee: Mitsubishi Denki Kabushiki Kaisha, Tokyo, Japan

[21] Appl. No.: 184,556

[22] PCT Filed: Aug. 10, 1987

[86] PCT No.: PCT/JP87/00597

§ 371 Date: Jun. 2, 1988

§ 102(e) Date: Jun. 2, 1988

[87] PCT Pub. No.: WO88/01240

PCT Pub. Date: Feb. 25, 1988

[30] Foreign Application Priority Data

Aug. 19, 1986 [JP] Japan .................. 61-194265
Aug. 19, 1986 [JP] Japan .................. 61-194266

[51] Int. Cl.⁵ ............................................ B60K 31/04
[52] U.S. Cl. ........................ 364/426.04; 180/179; 123/350; 123/351
[58] Field of Search ............... 364/431.04, 431.07, 364/426.04; 123/353, 354, 355, 361, 399, 352; 180/178, 179

[56] References Cited

U.S. PATENT DOCUMENTS

| 3,580,355 | 5/1971 | Kitano et al. | 180/179 |
| 3,952,829 | 4/1976 | Gray | 123/353 |
| 4,098,242 | 7/1978 | Anderson | 123/353 |
| 4,120,373 | 10/1978 | Fleischer | 123/399 |
| 4,248,321 | 2/1981 | Collonia | 180/179 |
| 4,495,454 | 1/1985 | Collonia | 364/431.05 |
| 4,553,209 | 11/1985 | Hyodo et al. | 364/431.07 |
| 4,726,187 | 2/1988 | Reinhardt et al. | 123/361 |

Primary Examiner—Parshotam S. Lall
Assistant Examiner—V. Trans
Attorney, Agent, or Firm—Sughrue, Mion, Zinn, Macpeak & Seas

[57] ABSTRACT

A constant speed drive unit or cruise control in which an output approximate to a required gain characteristic is obtained from a speed signal, frequency conversion of the approximate output is carried out, and a motor is driven with a converted frequency pulse, whereby variable gain control approximate to a gain of the automobile is achieved. When speed deviation (difference between actual speed and set speed) is small, operation is switched to a constant gain control to improve control stability.

2 Claims, 8 Drawing Sheets

SPEED CONTROL UNIT FOR AN AUTOMOBILE

TECHNICAL FIELD

The present invention relates to a constant speed drive unit in which a throttle valve of an automomobile is controlled by an actuator of the stepper motor type, and controllability is improved by variable gain control in which the throttle valve opening speed is variably controlled corresponding to the driving speed of the automobile. More particularly, the invention relates to a constant speed drive unit in which, when deviation between the set speed and the actual speed of the automobile is less than a specified level, variable gain control is invalidated and switched to constant gain control to improve controllability and stability.

BACKGROUND ART

Hitherto, in the constant speed drive unit or cruise control of the stepper motor type, the characteristic of the throttle valve opening speed with respect to the driving speed of the automobile (hereinafter referred to as "gain characteristic") is almost flat; in other words, a constant gain characteristic is given to the conventional constant speed unit.

Driving performance as well as acceleration performance varies depending on the type of automobile. For example, a sports car is better in driving performance than a commercial vehicle or a passenger car, and acceleration performance of a sports car is also higher. Accordingly, higher responsiveness is desired in the constant speed drive unit of the sports car, and the gain characteristic thereof is desired to be the approximately linear in a relation to drive speed thereof.

On the other hand, in commercial vehicle, high responsiveness is not required as it is with a sports car in view of the high loading capacity, but a flat gain characteristic is desired for every driving speed thereof.

In a passenger car, a linear characteristic similar to that of a sports car is required up to an intermediate speed region, while a saturation or lowering characteristic is desired in the high speed region in view of safety concerns.

Since a characteristic, whose gain characteristic is almost flat, is given to the conventional constant speed drive unit as mentioned above, a problem exists in that it is impossible to obtain a desirable gain characteristic flexibly corresponding to the type of automobile.

The present invention was made to solve the above problem and has an object of providing a constant speed drive unit in which the pulse motor speed is flexibly controlled corresponding to the gain characteristic, whereby controllability and stability are both improved.

SUMMARY OF THE INVENTION

In the constant speed drive unit according to the present invention, a speed signal is inputted to a broken line approximation circuit to obtain an analog output signal corresponding to a gain characteristic; the analog signal is inputted to a voltage/frequency converter to convert it to a reference pulse signal; the reference pulse signal and a pulse signal obtained from an encoder mounted on the actuator motor shaft are inputted to a phase comparator to obtain an output pulse signal having a pulse width proportional to a phase difference between the two signals; and PWM is carried out with either a triangular wave or a sawtooth wave after passing an integration circuit in the next step, so that drive control of the actuator motor is carried out by this modulated pulse. In this manner, the speed of the motor is controlled according to the gain characteristic and, as a result, a constant speed drive unit having a required gain characteristic is obtained.

Furthermore, by driving the pulse motor synchronously with the reference pulse, not only the speed of the pulse motor is controlled corresponding to the gain characteristic, but also the pulse motor is driven at a constant frequency when speed deviation between the set driving speed and the actual driving speed is less than a specified level, thereby improving the stability of the control.

DETAILED DESCRIPTION OF THE INVENTION

Preferred embodiments of the constant speed drive unit according to the present invention are now described with reference to the accompanying drawings.

Figure 1:
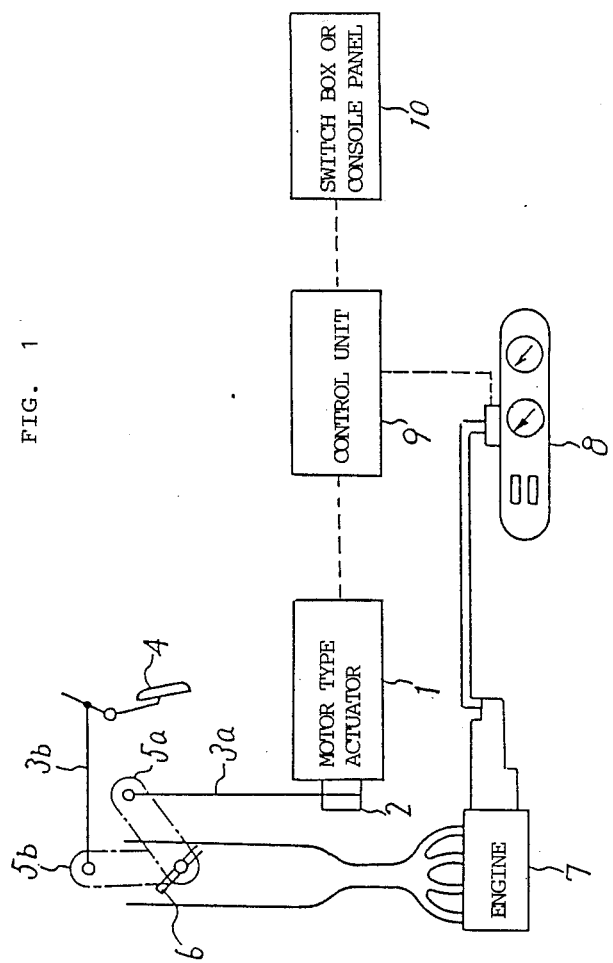
FIG. 1 is a block diagram of an embodiment of the constant speed drive unit according to the present invention.

FIG. 1 illustrates a system block diagram of a motor type constant speed drive unit according to the invention. In the drawing, reference numeral 1 indicates a motor type actuator, numeral 2 indicates a wire take-up reel. A wire 3a is wound around the take-up reel 2, and an end of the wire 3a is connected to a throttle valve 6 through a throttle link 5a.

An accelerator pedal 4 is also connected to the throttle valve 6 through a throttle link 5b. Throttle opening of the throttle valve 6 is controlled by the accelerator pedal 4 and the actuator 1.

Engine speed of an engine 7 changes according to the throttle opening, and the engine speed, i.e., driving speed of automobile is read on a speedometer 8. The actuator 1 is controlled by a control unit 9. In addition, numeral 10 indicates a switch box or a console panel.

Referring to FIG. 1, the actuator 1 of the electric motor type actuates the throttle link 5a irrespective of the operation of the accelerator pedal 4 to keep the throttle valve 6 at a required opening, whereby it is possible to control driving speed of automobile to be at a constant speed of certain value.

Figure 2:
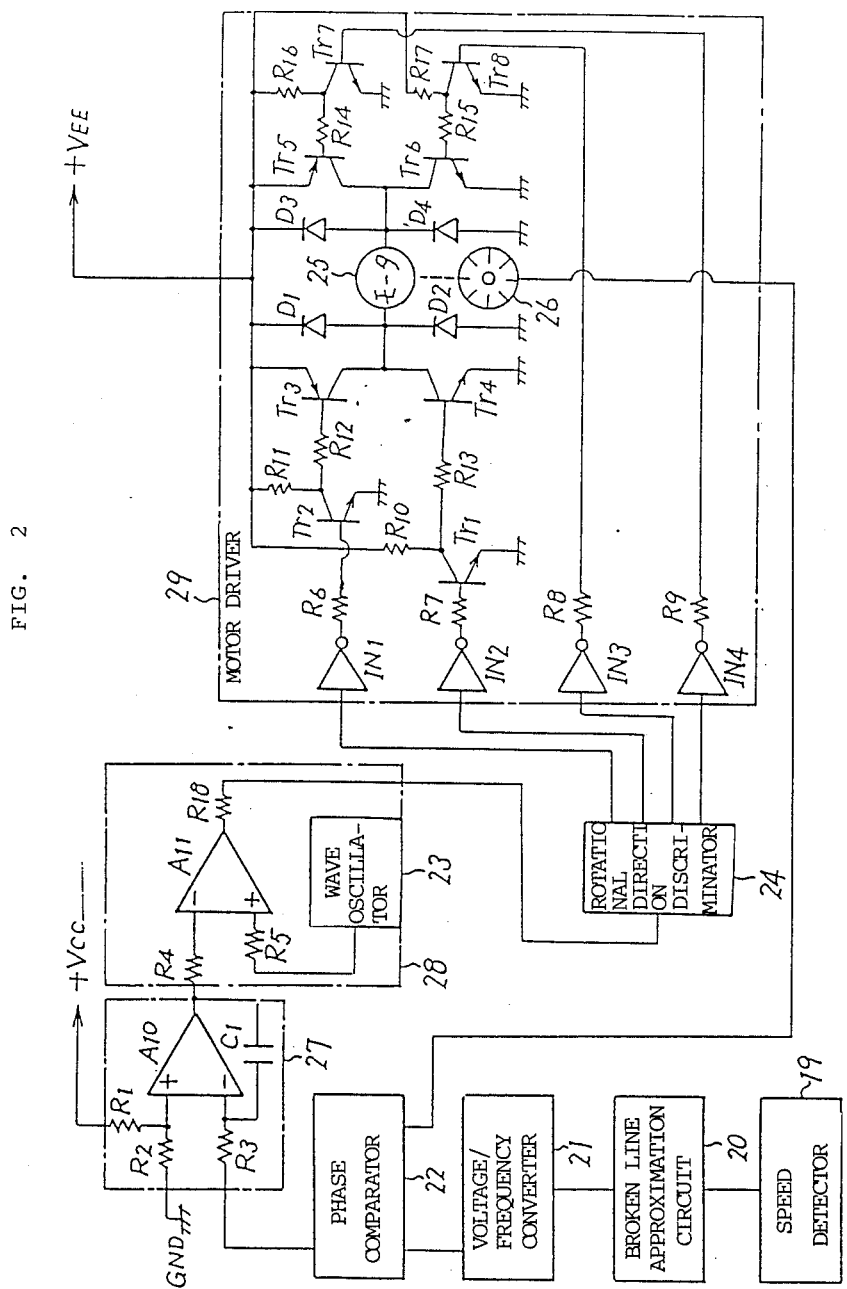
FIG. 2 is a block diagram of a control system in the constant speed drive unit according to the invention.

FIG. 2 is a block diagram of the control system of the first embodiment of the drive unit according to the invention, and illustrates partially an internal arrangement of the control unit 9 illustrated in FIG. 1. In FIG. 2, numeral 19 indicates a speed detector which is mounted on such a member as the drive shaft of the engine and outputs an analog voltage proportional to the driving speed of the automobile.

Output of the speed detector 19 is inputted to the broken line approximation circuit 20. The broken line approximation circuit 20, to which the speed signal is inputted, outputs an analog signal corresponding to a required gain curve to the voltage/frequency (hereinafter referred to as "V/F") converter 21.

The V/F converter 21, to which the analog signal obtained from the broken line approximation circuit 20 is inputted, converts the analog signal to a pulse frequency signal and outputs it as a reference pulse signal to the phase comparator 22 in the next stage.

The phase comparator 22, to which the reference pulse signal and a speed pulse signal obtained as a comparative input signal from the encoder 26 mounted on the shaft of the DC motor 25 are inputted, carries out synchronization control.

That is to say, a phase difference between the two signals is detected, and a pulse signal (PLL output) having a pulse width proportional to the phase difference is outputted.

The pulse signal is then inputted to a (−) input terminal of an operational amplifier A10 of the integration circuit 27 in the next stage through a resistor R3.

The (+) input terminal of the operational amplifier A10 is grounded through a resistor R2 and also connected to a power supply +VCC through a resistor R1. A capacitor C1 is interposed between the output terminal and the (−) input terminal of the operational amplifier A10.

The output terminal of the operational amplifier A10 is connected to the (−) input terminal of an operational amplifier A11 of the PWM (pulse width modulation) circuit 28 through a resistor R4.

Output of the triangular wave or sawtooth wave oscillator 23 is inputted to the (+) input terminal of the operational amplifier A11 through a resistor R5. Output of the operational amplifier A11 is sent to a rotational direction discriminator 24 through a resistor R18.

Output of the rotational direction discriminator 24 is inputted to transistors $Tr_2$, $Tr_1$, $Tr_8$, $Tr_7$ through inverters IN1 to IN4 and resistors R6 to R9 respectively. The transistors $Tr_1$ to $Tr_8$ are essential components of a motor driver 29. Emitters of the transistors $Tr_1$, $Tr_2$ are grounded, while collectors of the two transistors $Tr_1$, $Tr_2$ are connected to a power supply +VEE through resistors R10, R11 and connected also to bases of the transistors $Tr_4$, $Tr_3$ through resistors R13, R12.

The emitter of the transistor $Tr_3$ is connected to the power supply +VEE, while emitter of the transistor $Tr_4$ is grounded. Collectors of the two transistors $Tr_3$, $Tr_4$ are connected to collectors of the transistors $Tr_5$, $Tr_6$ through the DC motor 25.

Diodes D1 to D4 are respectively interposed between the collectors and the emitters of the transistors $Tr_3$ to $Tr_6$. The emitter of the transistor $Tr_5$ is connected to the power supply +VEE, while the emitter of the transistor $Tr_6$ is grounded.

The emitters of the transistors $Tr_7$, $Tr_8$ are grounded, while collectors thereof are respectively connected to the power supply +VEE through resistors R16, R17 and also connected to bases of the transistors $Tr_5$, $Tr_6$ through resistors R14, R15.

The control system in FIG. 2 of above arrangement performs the following functions. The speed detector 19 delivers an analog voltage proportional to a speed of the automobile to the broken line approximation circuit 20, from which an analog signal corresponding to a required gain curve is sent to the V/F converter 21. The analog signal is then converted to a pulse frequency signal by the V/F converter 21 and outputted to the phase comparator 22 as a reference signal.

A motor speed pulse signal obtained from the encoder 26 is also sent to the phase comparator 22. The phase comparator 22 carries out phase comparison between the motor speed pulse signal and the comparative reference signal to detect a phase difference therebetween, and sent a pulse signal having a pulse width proportional to the the phase difference to the integration circuit 27.

The signal is converted again to an analog value by the integration circuit 27, then inputted to the PWM circuit 28 in the next stage. The signal is modulated by the output of the triangular wave or sawtooth wave oscillator 23, and in this manner a pulse signal (PWM output) proportional to the analog output value of the integration circuit 27 is outputted.

The PWM signal is then inputted to the rotational direction discriminator 24 in the next stage, where 4 (four) drive signals are outputted to carry out drive control of the motor driver circuit 29 in the next stage essentially formed of the transisotrs $Tr_1$ to $Tr_8$.

By means of this motor driver circuit 29, motor speed is subject to the phase synchronization control in order to coincide with the gain characteristic obtained by the broken line approximation circuit 20, and at the same time the rotational direction is also controlled.

Figure 3:
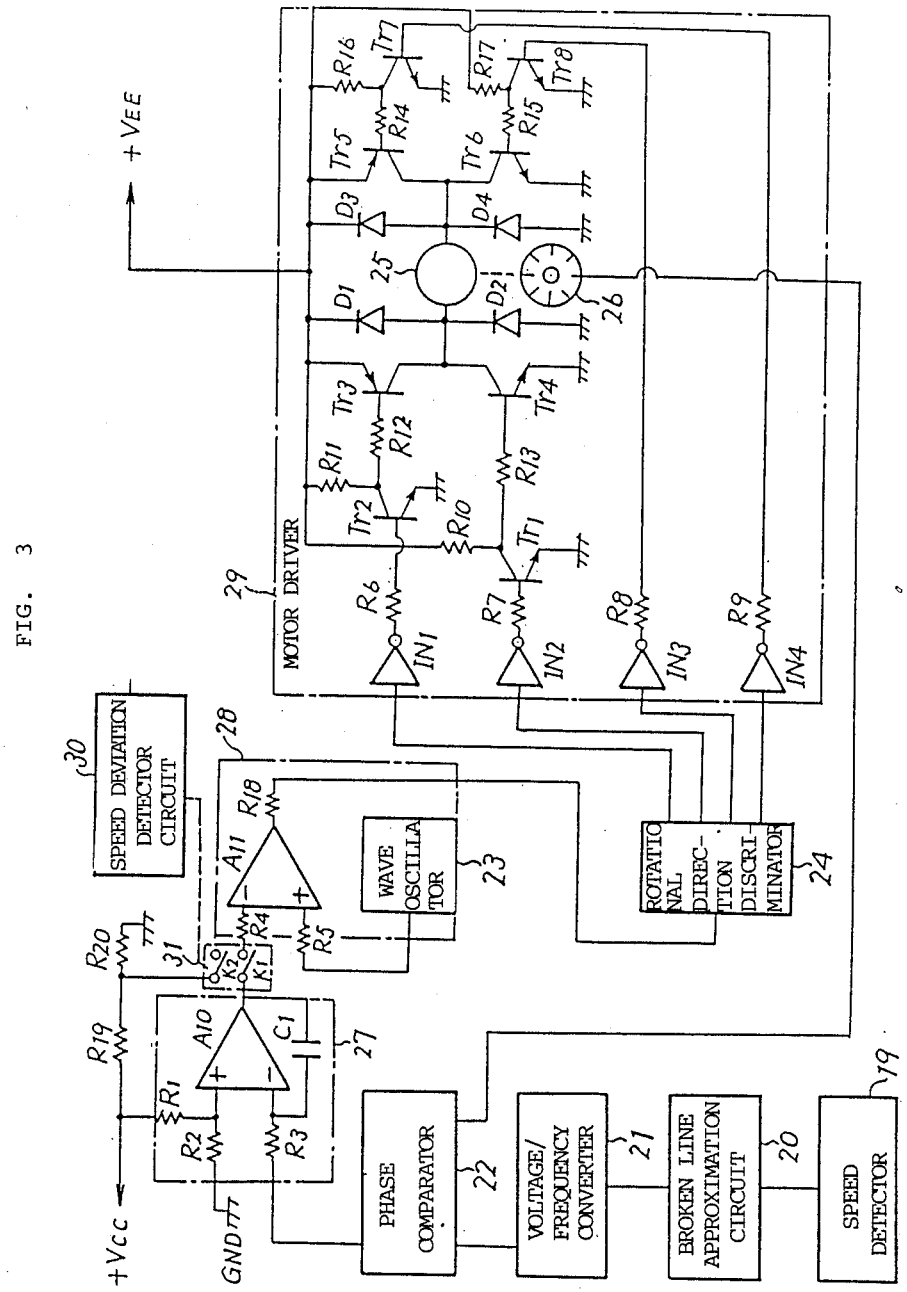
FIGS. 3 to 5 are respectively block diagrams of second to fourth embodiments of the control system in the constant speed drive unit according to the invention.

FIG. 3 is a block diagram illustrating a control system of the second embodiment of the constant speed drive unit according to the invention, and in which numeral 30 indicates a speed deviation detector circuit for detecting a difference between set driving speed and actual driving speed of automobile. When the speed deviation is less than a certain level, a switching circuit 31 in the next stage is operated to open an analog switch K1 while closing an analog switch K2, whereby a constant voltage is applied to the PWM circuit 28, invalidating the variable control and being switched to the constant gain control. In addition, resistors R19, R20 form a resistance circuit to generate a reference voltage for carrying out the constant gain control. Components other than those described above are the same as the foregoing first embodiment illustrated in FIG. 2, and therefore repeated description thereof is omitted herein.

Figure 4:
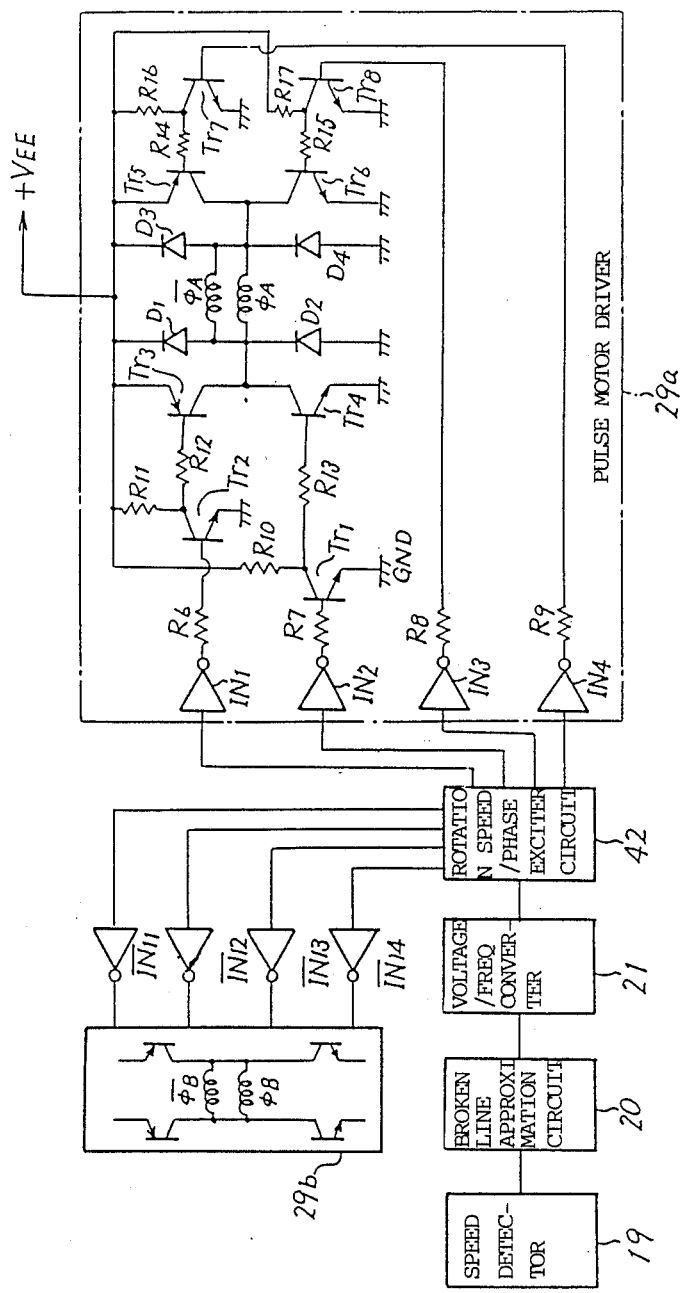

FIG. 4 is a block diagram of a control system of the third embodiment of the drive unit according to the invention, and in which numeral 19 indicates a speed detector mounted on such a part as the drive shaft of an engine to output an analog voltage proportional to the driving speed of the automobile. Numeral 20 indicates a broken line approximation circuit discussed in detail later to which the speed signal is inputted, and from which an analog signal proportional to a required gain curve is outputted.

The analog signal is outputted to the voltage/frequency converter 21. The output of the voltage/frequency converter 21 is supplied to a rotation speed/phase-excitation discriminator 42.

The output of the rotation speed/phase-excitation discriminator 42 is supplied to the bases of the transistors $Tr_2$, $Tr_1$, $Tr_8$, $Tr_7$ through the inverters $IN_1$ to $IN_4$ and the resistors R6 to R9 of a pulse motor drive 29a of an A-phase winding, and also supplied to a pulse motor driver 29 of a B-phase winding through the inverters $IN_{11}$ to $IN_{14}$.

Each emitter of the transisotrs Tr$_1$, Tr$_2$ is grounded, while each connector thereof is connected to the power supply +VEE through the resistors R10, R11.

Likewise, each emitter of the transisotrs Tr$_7$, Tr$_8$ is grounded, while each connector thereof is connected to the power supply +VEE through the resistors R16, R17.

Each collector of the transistors Tr$_2$, Tr$_1$ is connected to the bases of the two transistors Tr$_3$, Tr$_4$ through the resistors R12, R13. The transistors Tr$_3$, Tr$_4$ have a common collector which is connected to a common collector of the transistors Tr$_5$, Tr$_6$ through a pulse motor winding $\phi$A. The emitter of the transistor Tr$_3$ is connected to the power supply +VEE, while emitter of the transistor Tr$_4$ is grounded.

Collectors of the transistors Tr$_7$, Tr$_8$ are connected respectively to the bases of the transistors Tr$_5$, Tr$_6$ through the resistors R14, R15. The emitter of the transistor Tr$_5$ is connected to the power supply +VEE, while emitter of the transistor Tr$_6$ is grounded.

Diodes D1 to D4 are respectively interposed between each emitter and collector of the transistors Tr$_3$ to Tr$_6$, and a pulse motor winding $\overline{\phi A}$ is interposed between the junctions of diodes D1, D2 and those of diodes D3, D4.

The pulse motor driver 29b of B-phase winding is likewise arranged to drive the pulse windings $\phi$B, $\overline{\phi}$B. Arrangement of the pulse motor driver 29b of B-phase winding is substantially the same as the pulse motor driver 29a of A-phase winding.

By the above arrangement, an analog voltage proportional to the driving speed of the automobile detected by the speed detector 19 is inputted to the broken line approximation circuit 20.

The broken line approximation circuit 20, to which the speed signal is inputted, outputs an analog signal corresponding to a required gain curve to the voltage/frequency converter 21.

The voltage/frequency converter 21, to which the analog signal obtained by the broken line approximation circuit 20 is inputted, converts the analog signal to a pulse frequency and inputs it to the motor drivers 29a, 29b through the rotation speed/phase-excitation discriminator 42, and then excites the pulse motor windings $\phi$A, $\overline{\phi}$A, $\phi$B, $\overline{\phi}$B synchronously with the pulse frequency, whereby speed control of the pulse motor is carried out corresponding to the gain chatcteristic obtained by the broken line approximation circuit 20, and at the same time rotational direction is also controlled.

Figure 5:
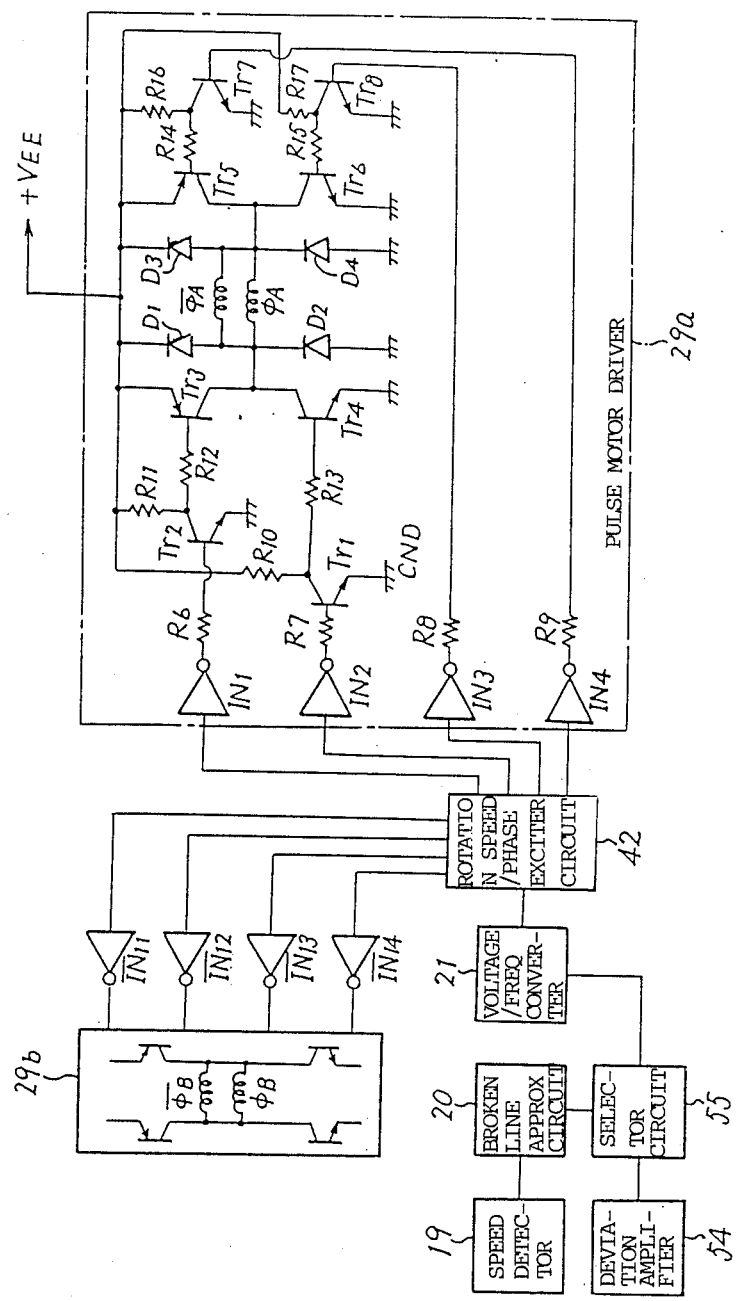

FIG. 5 is a block diagram illustrating the fourth embodiment of the control system of the drive unit according to the invention, and in which the speed detector 19 is mounted on such a member as the drive shaft of an engine and an analog voltage proportional to the driving speed of the automobile is outputted. The output is sent to the broken line approximation circuit 20. The broken line approximation circuit, to which the speed signal is inputted, outputs an analog signal corresponding to a required gain curve to the voltage/frequency converter 21.

In the meantime, a set driving speed and an actual driving speed (both in analog value) are inputted to a deviation amplifier 54, and an analog voltage proportional to a deviation therebetween is outputted to a selecting circuit 55.

The selecting circuit 55, to which the output voltage from the deviation amplifier 54 is inputted, discriminates level of the output voltage, and if the level is less than a certain value, a constant voltage is outputted to the voltage/frequency converter 21. If not, output from the broken line approximation circuit 20 supplied simultaneously to the selecting circuit 55 is delivered to the voltage/frequency converter 21.

The voltage/frequency converter 21, to which the analog signal obtained from the selecting circuit 55 is inputted, converts the analog signal to a pulse frequency and inputs it to the pulse motor drivers 29a, 29b through the rotation speed/phase-excitation discriminator 42, and excites the 4-phased pulse motor windings $\phi$A, $\overline{\phi}$A, $\phi$B, $\overline{\phi}$B, synchronously with the pulse frequency, whereby speed control of the pulse motor is carried out corresponding to the gain characteristic obtained in the broken line approximation circuit 20.

When the speed deviation is less than a certain level, the pulse motor is driven at a constant speed with a pulse of constant frequency, and the rotational direction is also controlled at the same time.

In the embodiment illustrated in FIG. 5, other features and functions are the same as that in FIG. 4.

In addition, arrangement of the pulse motor driver 29b of the B-phase winding is substantially the same as the pulse motor driver circuit 29a.

Figure 6:
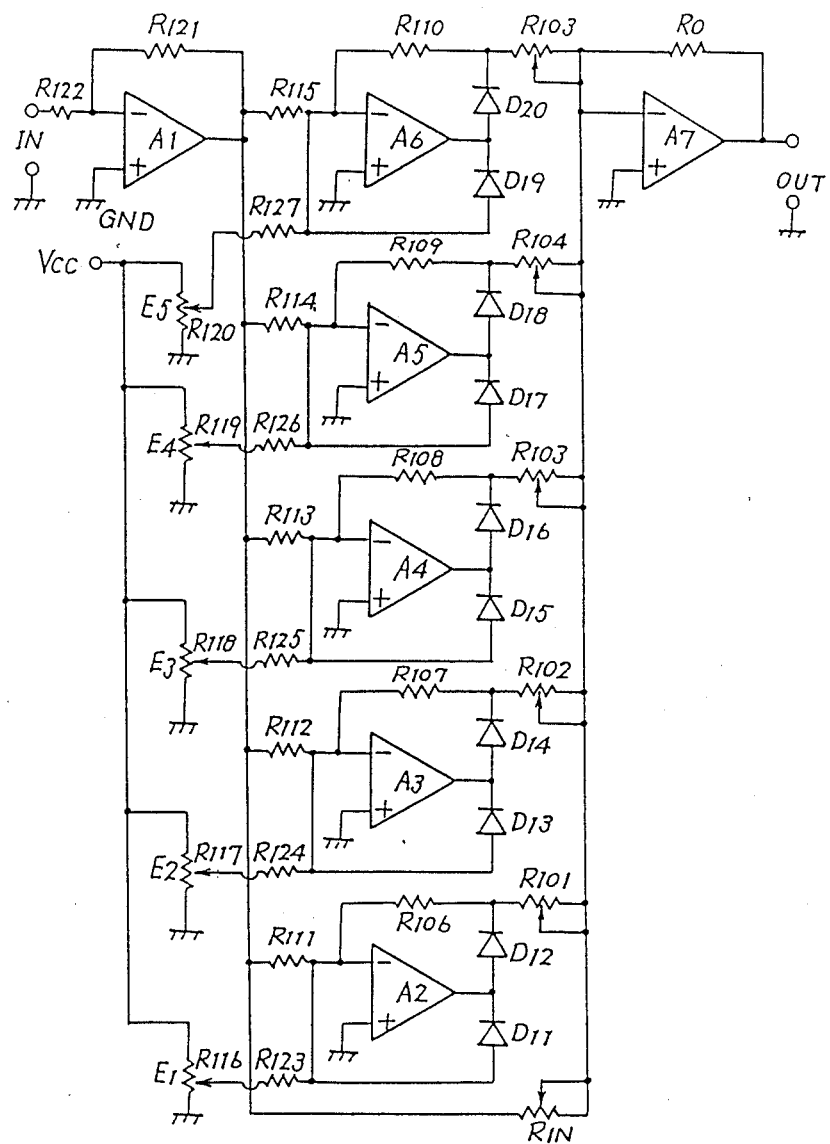
FIG. 6 is a circuit diagram of the broken line approximation circuit in the control system shown in FIGS. 2 to 4.

FIG. 6 illustrates an example of the broken line approximation circuit 20 shown in FIGS. 2 to 5, and in which numeral A1 indicates an input amplifier, numeral A7 indicates an output amplifier, and numerals A2 to A6 indicate adders each carrying out broken line approximation.

The speed signal from the speed detector 19 is inputted to the input terminal IN, and sent by way of the resistor 122 to the (−) input terminal of the input amplififier A1, while the (+) input terminal thereof is grounded. A resistor 121 is interposed between the (−) input terminal and output terminal of the input amplifier A1.

Output of the operational amplifier A1 is inputted to each of the (−) input terminals of the adders A2 to A6 through resistors R111 to R115 respectively, and adding values E1 to E5 are respectively inputted to each of the (−) input terminals through variable resistors R116 to R120 and resistors R123 to R127.

The adding values E1 to E5 are respectively obtained from the variable resistors R116 to R120, and the variable resistors R116 to R120 are respectively interposed between the power supply VCC and ground.

Output terminals of the adders A2 to A6 are respectively interposed between the junctions of the diodes D11 and D12, D13 and D14 . . . D19 and D20. Anodes of the diodes D11, D13, D15, D17 D19 are connected to the (−) input terminals of the adders A2 to A6.

Each cathode of the diode D12, D14, D16, D18, D20 is interposed between each junction of the resistors R106 to R110 and each junction of the variable resistors R101 to R105. The serial circuit formed of the resistors R106 to R110 and variable resistors R101 to R105 is connected to each of the (−) input terminals of the adders A2 to A6 and that of the output amplifier A7.

Each (+) input terminal of the adders A2 to A6 and of the output amplifier A7 is earthed. A resistor R$_0$ is interposed between the (−) input terminal and the output terminal of the output amplifier A7. This output terminal is connected to an output terminal OUT. A variable resistor RIN is interposed between the output terminal of the input amplifier A1 and the (−) input terminal of the output amplifier A7.

Figure 7:
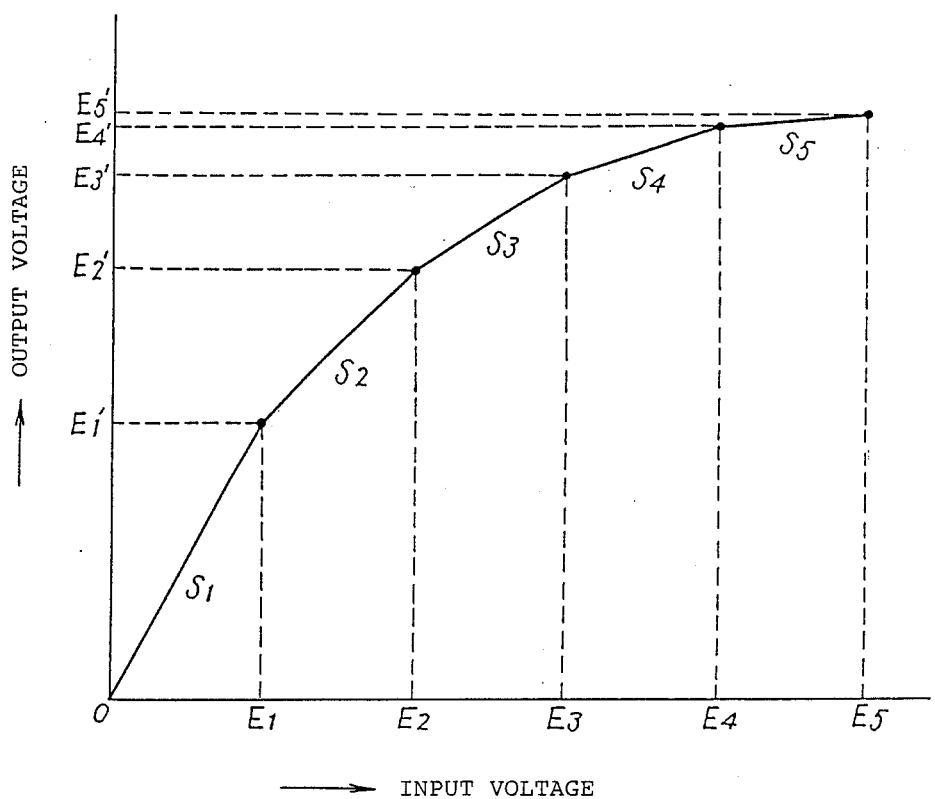
FIG. 7 is a diagram illustrating an example of the output characteristic of the broken line approximation circuit.

Described hereinafter is a function of the broken line approximation circuit of above arangement. Establishing that adding values of the adders A2 to A6 are E1 to E5, the output characteristic of the broken line approximation circuit can be as illustrated in FIG. 7, and inclinations S1 to S5 forming each section are decided by the following expressions:

$$S1 = R_0 \left( \frac{1}{RIN} \right) \quad (1)$$

$$S2 = R_0 \left( \frac{1}{RIN} - \frac{1}{R101} \right) \quad (2)$$

$$S3 = R_0 \left( \frac{1}{RIN} - \frac{1}{R101} - \frac{1}{R102} \right) \quad (3)$$

$$S4 = R_0 \left( \frac{1}{RIN} - \frac{1}{R101} - \frac{1}{R102} - \frac{1}{R103} \right) \quad (4)$$

$$S5 = R_0 \left( \frac{1}{RIN} - \frac{1}{R101} - \frac{1}{R102} - \frac{1}{R103} - \frac{1}{R104} \right) \quad (5)$$

The above output characteristic corresponds to a gain characteristic, and it is to be noted that not only the above positive inclinations but also zero or negative inclination can be selected by changing the constant (resistance value).

Figure 8:
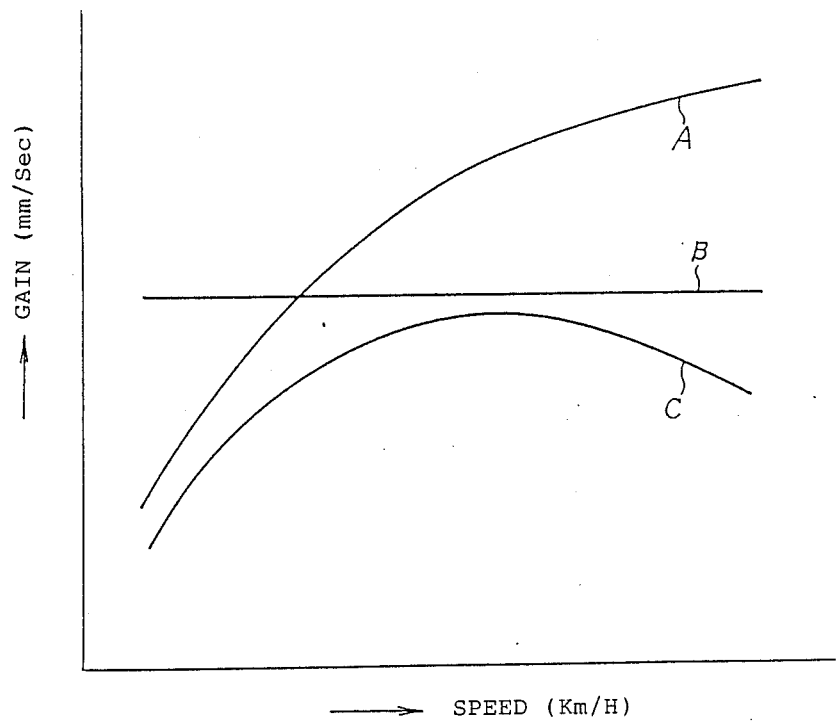
FIG. 8 is a diagram illustrating an example of the gain charateristic with respect to the driving speed.

FIG. 8 shows a gain characteristic of the constant speed drive unit desirable in general, and in which reference A indicates a characteristic of a sports car, B inidcates that of a commercial vehicle, and C indicates that of an ordinary passenger car. In this manner, gain characteristic can be easily achieved by using the above broken line approximation circuit.

We claim:

1. A speed control unit for an automobile in which a throttle valve is operated by an electric actuator driven by a motor, and a driving speed of said automobile is adjusted by controlling a throttle opening, said control unit comprising:
    a broken line approximation circuit to which a speed signal proportional to a speed of the automobile is inputted to obtain an analog output signal corresponding to a specified gain characteristic of the driving speed of the automobile with respect to a throttle valve opening speed of said throttle valve;
    a voltage/frequency converter which obtains a reference pulse signal corresponding to said analog output signal of the broken line approximation circuit;
    an encoder for outputting a motor speed pulse signal;
    a phase comparator which compares said motor speed pulse signal of said motor with said reference pulse signal, and generates an output pulse having a pulse width proportional to a phase difference therebetween;
    integration means for obtaining an integration value of the output pulse; and
    drive control means which carries out pulse width modulation of said integration value of the output pulse of said phase comparator by a triangular wave or a sawtooth wave, and controls said motor in such a manner that the throttle valve opening speed is variably controlled corresponding to the driving speed of the automobile.

2. A speed control unit according to claim 1, wherein said control means invalidates variable control of a gain of the throttle valve opening speed corresponding to the driving speed of the automobile when a speed deviation between a set driving speed and an actual driving speed is less than a certain level, and switches to a constant gain control.

* * * * *